United States Patent

[11] 3,550,677

| [72] | Inventor | James A. Knowles<br>Arcadia, Calif. (632 Monterey Pass Road,<br>Monterey Park, Calif., 91754) |
|---|---|---|
| [21] | Appl. No. | 751,559 |
| [22] | Filed | Aug. 9, 1968 |
| [45] | Patented | Dec. 29, 1970 |

[54] METHOD OF AND APPARATUS FOR PRECOOLING AIR IN A FACILITY WITH WATER USED IN THE FACILITY
5 Claims, 1 Drawing Fig.

[52] U.S. Cl. .................................................. 165/1,
165/32, 165/108
[51] Int. Cl. ..................................................... F28f 13/06
[50] Field of Search ........................................... 165/1, 11,
32, 35, 38, 108, 22, 50, 71, 101, 103

[56] References Cited
UNITED STATES PATENTS

| 1,957,624 | 5/1934 | Warner | 62/260 |
| 3,402,765 | 9/1968 | Westeren et al. | 165/65 |
| 3,203,475 | 8/1965 | Crews et al. | 165/108 |
| 3,236,292 | 2/1966 | Smith, Jr | 165/11 |
| 3,384,155 | 5/1968 | Newton | 165/22 |

Primary Examiner—Charles Sukalo
Attorney—Harris, Kiech, Russell & Kern

ABSTRACT: A method of and an apparatus for precooling the air entering a facility, such as a building, with the water used in the facility. Water is diverted from the water supply system to a heat exchanger at a diversion point upstream from a point of use of water in the facility, air flowing through the heat exchanger into the facility being precooled by the diverted water flowing therethrough. Thereafter, the diverted water is returned to the water supply system downstream from the diversion point for use in the facility, any excess diverted water being bled off in the event that the rate of water use downstream from the diversion point is less than the rate of water diversion for air precooling purposes.

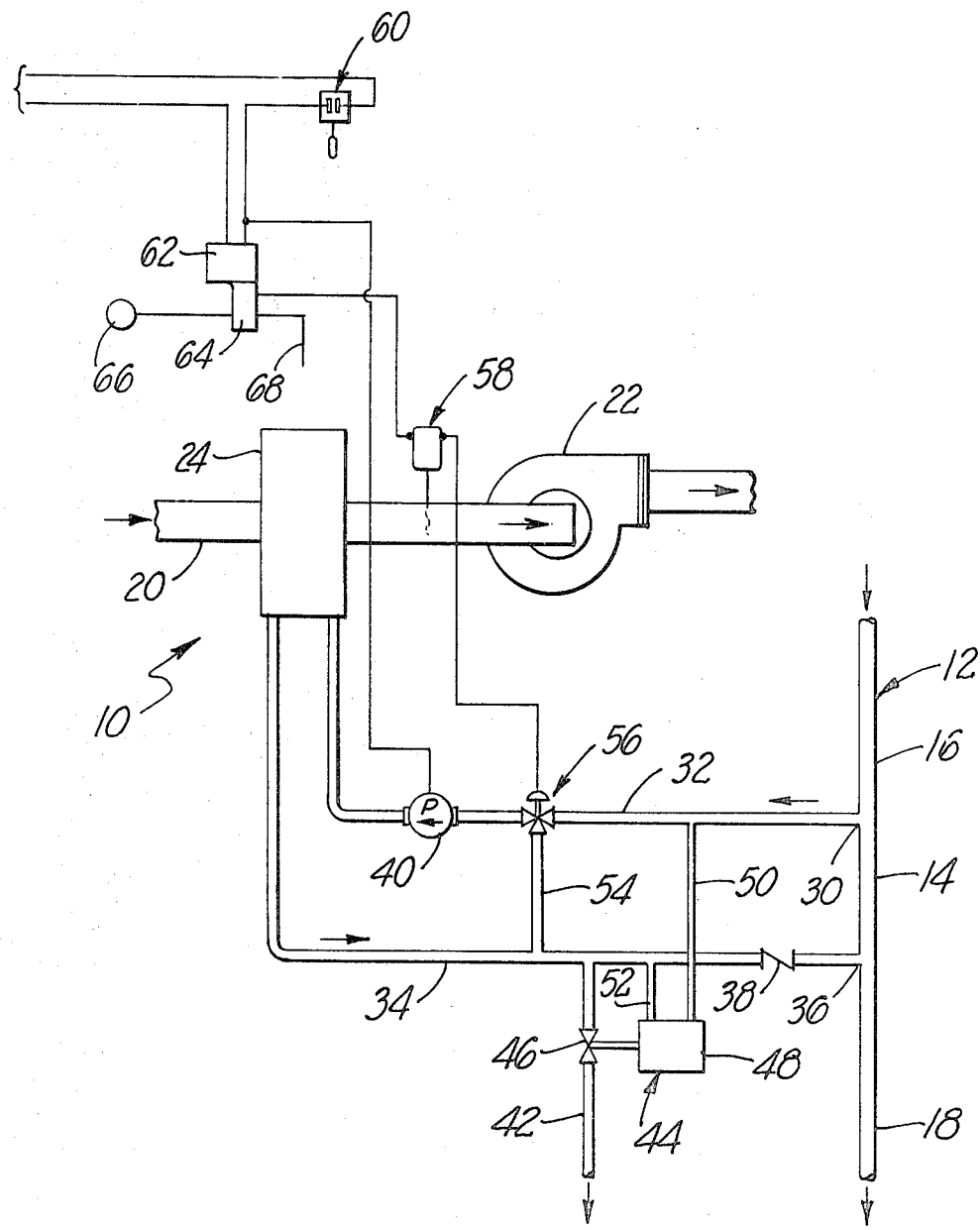
INVENTOR
JAMES A. KNOWLES
BY HIS ATTORNEYS
HARRIS, KIECH, RUSSELL & KERN

METHOD OF AND APPARATUS FOR PRECOOLING AIR IN A FACILITY WITH WATER USED IN THE FACILITY

BACKGROUND OF INVENTION

Many facilities requiring air cooling systems also utilize large quantities of water for processing or other operations. Normally, the temperature of the water in the supply system serving the facility is significantly below the temperature desired for the air in the facility. In some instances, the temperature of the water furnished the facility by its water supply system is too low for the particular processing operation to be carried out in the facility. In other instances, the temperature of the water entering the facility may be elevated, prior to use for processing or other operations, without objection.

Merely as an example, photographic film-processing laboratories require large quantities of water at temperatures of 70° F or higher. Normally, the water furnished to such laboratories from conventional sources is at a considerably lower temperature, and must be heated prior to use. Similar situations exist in other processing facilities. In still other facilities, while heating of the water used therein is not necessary, it is not objectionable for most purposes.

SUMMARY AND OBJECTS OF INVENTION

With the foregoing background in mind, the primary object of the invention is to utilize water consumed in a facility to cool the air therein. Preferably, the water used in the facility is employed to precool the air entering the facility, the precooled air being subjected to further temperature conditioning as required to maintain the desired air temperature in the facility.

Considering the invention more specifically, an important object thereof is to provide a method of and apparatus for cooling air in or entering a facility having a water supply system for furnishing water to the facility for use therein, which involve: diverting water from the water supply system at a diversion point upstream from the point or points of use of water in the facility; transferring heat from air in or entering the facility, and preferably from air entering the facility from the exterior thereof, to the diverted water; and thereafter returning the diverted water, now at a higher temperature, to the water supply system downstream from the diversion point and upstream from the point or points of use as long as the rate of use of water downstream from the diversion point is at least equal to the rate of diversion. A related object is to bleed off any excess diverted water, after transferring heat thereto from the air entering the facility, in the event that the rate of diversion of water at the diversion point exceeds the rate of use of water downstream from the diversion point.

Another object is to mix diverted water to which heat has been transferred from the air entering the facility with diverted water to which no heat has yet been transferred, and then transfer heat from the air entering the facility to the resulting diverted water mixture. With this procedure and construction, the rate of water flow through the heat exchanger can be maintained constant while achieving a reduction in the temperature of the incoming air which is less than the maximum attainable with the system.

Another object in connection with the foregoing is to provide means for mixing water in a diverted water supply line with water in a diverted water return line and for delivering the resulting diverted water mixture to the heat exchanger, the mixing means including mixing valve means communicating with the diverted water supply and return lines, and including thermostat means responsive to the temperature of cooled air emanating from the heat exchanger for controlling the mixing valve means.

The foregoing objects, advantages, features and results of the present invention, together with various other objects, advantages, features and results thereof which will be evident to those skilled in the air conditioning art in the light of this disclosure, may be achieved with the exemplary embodiment of the invention illustrated in the accompanying drawing and described in detail hereinafter.

DESCRIPTION OF DRAWING

The single figure of the drawing illustrates diagrammatically an air cooling system which embodies the invention and which is capable of carrying out the method of the invention.

DESCRIPTION OF EXEMPLARY EMBODIMENT OF INVENTION

Referring to the drawing, designated generally therein by the numeral 10 is an apparatus or system for precooling the air entering a facility, such as a building, with the water used in the facility and delivered thereto by a water supply system 12. The latter is shown as comprising a water supply line 14 having its upstream end 16 connected to a suitable source, not shown, of water at a relatively low temperature, such as a water main, a well, or the like. The downstream end 18 of the water supply line 14 leads to a point or points of use of the water in the facility.

The air-precooling system 10 includes an outside air supply duct 20 through which outside air is delivered to the interior of the facility by a blower or fan means 22. A heat exchanger 24 in the line of the air supply duct 20 precools the air delivered to the interior of the facility in a manner which will be described. The precooled air may be delivered to any suitable air-conditioning system, not shown, for further temperature conditioning before actual discharge into the interior of the facility. Alternatively, the heat exchanger 24 may be the sole air-cooling means in the air-conditioning system of the facility.

Connected to the water supply line 14 at a diversion point 30 is a diverted water supply line 32 leading to the heat exchanger 24, the diversion point 30 being upstream from the point or points of use of the water in the facility. A diverted water return line 34 returns the water from the heat exchanger 24 to the water supply line 14 at a return point 36 downstream from the diversion point 30, a check valve 38 preventing reversed flow. An electric-motor-driven pump 40 in the diverted water supply line 32 delivers water to the heat exchanger 24 from the water supply line 14, and returns it to the water supply line through the diverted water return line 34. As the diverted water passes through the heat exchanger 24, heat is transferred thereto from the outside air flowing through the heat exchanger, thereby cooling, or precooling, the air entering the facility through the air supply duct 20.

In the event that the demand for water at the downstream end 18 of the water supply line 14 is less than the rate of water diversion to the heat exchanger 24, any excess is bled off to a suitable point of disposal through a bleed line 42. Flow through this bleed line is controlled by a differential pressure relief valve 44 which includes a valve 46 in the bleed line operated by a differential pressure responsive means 48 connected to the diverted water supply and return lines 32 and 34 by lines 50 and 52, respectively. Thus, the differential pressure relief valve 44 serves as a means for bleeding off excess water from the diverted water return line 34 through the bleed line 42 whenever the rate of water diversion to the heat exchanger 24 exceeds the rate of water use downstream from the diversion point 30.

Preferably, the pump 40 delivers water to the heat exchanger 24 at a constant rate. If the outside air temperature is not much above the temperature desired for the outside air delivered to the interior of the facility, the heat exchanger 24 may reduce the temperature of the incoming air excessively. To prevent this, some of the diverted water which has passed through the heat exchanger 24 may be recirculated through the heat exchanger by mixing it with fresh diverted water from the water supply line 14 in the diverted water supply line 32. With this in mind, a recirculating line 54 connects the diverted water return line 34 to the diverted water supply line 32 through a pneumatic three-way proportional mixing valve or valve means 56 controlled by a thermostat or thermostat means 58 responsive to the temperature of the cooled air in the air supply duct 20 downstream from the heat exchanger 24. With this construction, heated diverted water is mixed with unheated diverted water upstream from the heat exchanger 24 to maintain the temperature of the cooled air emanating from the heat exchanger at the desired value. It will be understood, of course, that heated diverted water is recirculated through the heat exchanger 24 only when the air temperature would be reduced excessively by the use of unheated diverted water only.

The entire system 10 is controlled by a thermostat or thermostat means 60 responsive to the air temperature outside the facility. More particularly, the thermostat 60 is connected to the electric-motor-driven pump 40 and to a solenoid 62 which operates a valve 64 supplied with compressed air from a suitable source 66. When the solenoid 62 is energized, the valve 64 delivers compressed air from the source 66 to the pneumatic-mixing valve 56, under the control of the thermostat 58. When the solenoid 62 is deenergized, the valve 64 shuts off the flow of compressed air from the source 68 and discharges compressed air from the line to the thermostat 68 and the pneumatic-mixing valve 56 through a discharge line 68.

Thus, when the thermostat 60 demands precooling of the air entering the facility, it energizes the pump 40 and the solenoid 62. The latter causes the valve 64 to deliver compressed air from the source 66 to the pneumatic-mixing valve 56, provided that the thermostat 58 demands mixing of heated diverted water with unheated diverted water upstream from the heat exchanger 24.

It will thus be apparent that the system 10 achieves the basic object of the invention of utilizing water consumed in a facility to cool the air admitted thereto. More particularly, the invention extracts any available cooling capacity from the water used in the facility while conserving the water for normal use within the facility. Furthermore, since the water diversion system interconnecting the water supply line 14 and the heat exchanger 24 is a closed system, any available cooling capacity is utilized without contamination of the water, which is another important feature.

The invention has another important advantage in instances where the incoming water must be heated for processing purposes, in that it eliminates, or materially reduces, the necessity for applying heat to the water from other sources, thereby reducing power or fuel consumption.

Still another feature of the invention is that the capacity of any air-conditioning system utilized downstream from the heat exchanger 24 may be reduced materially, thereby saving on initial costs, as well as power or fuel consumption.

While the system 10 has been described as an air-cooling system utilizing water consumed in the facility as the cooling medium, the system may function as a preheating or heating system in the event that the outside air temperature is below the level desired for the interior of the facility, and may also transfer heat to or from any suitable fluid medium, other than water, which is utilized in the facility.

Although an exemplary embodiment of the invention has been disclosed herein for purposes of illustration, it will be understood that various changes, modifications and substitutions may be incorporated therein without departing from the spirit of the invention as defined by the claims appearing hereinafter.

I claim:

1. A method of cooling air in a facility having a water supply system for furnishing water to the facility for use therein, including the steps of:
   a. diverting water from the water supply system at a diversion point upstream from a point of use of water in the facility;
   b. transferring heat from air in the facility to the diverted water;
   c. thereafter returning the diverted water to the water supply system downstream from said diversion point and upstream from said point of use as long as the rate of use of water downstream from said diversion point is at least equal to the rate of diversion of water at said diversion point;
   d. subsequently using the diverted water which has been returned to the water supply system for a purpose or purposes other than cooling air; and
   e. bleeding off any excess diverted water, after transferring heat thereto from air in said facility, in the event that the rate of diversion of water at said diversion point exceeds the rate of use of water downstream from said diversion point.

2. A method of cooling air in a facility having a water supply system for furnishing water to the facility for use therein, including the steps of:
   a. diverting water from the water supply system at a diversion point upstream from a point of use of water in the facility;
   b. transferring heat from air in the facility to the diverted water;
   c. thereafter returning the diverted water to the water supply system downstream from said diversion point and upstream from said point of use as long as the rate of use of water downstream from said diversion point is at least equal to the rate of diversion of water at said diversion point;
   d. subsequently using the diverted water which has been returned to the water supply system for a purpose or purposes other than cooling air;
   e. mixing diverted water to which heat has been transferred from air in the facility with diverted water to which no heat has yet been transferred; and
   f. then transferring heat from air in the facility to the resulting diverted water mixture.

3. In an air-cooling system for a facility having a water supply system for furnishing water to the facility for use therein for a purpose or purposes other than air cooling, the combination of:
   a. a heat exchanger;
   b. means for flowing air through said heat exchanger into the facility;
   c. means for diverting water from the water supply system at a diversion point upstream from a point of use of water in the facility to the heat exchanger, including a diverted water supply line;
   d. means for returning the diverted water to the water supply system downstream from said diversion point and upstream from said point of use as long as the rate of water use downstream from said diversion point is at least equal to the rate of water diversion at said point of diversion, including a diverted water return line;
   e. whereby the diverted water returned to the water supply system is available for use at said point of use for a purpose or purposes other than air cooling;
   f. pump means in one of said diverted water lines for circulating water through said diverted water supply line, said heat exchanger and said diverted water return line; and
   g. bleed means for bleeding off water from said diverted water return line as long as the rate of water use downstream from said diversion point is less than the rate of water diversion at said diversion point.

4. In an air-cooling system for a facility having a water supply system for furnishing water to the facility for use therein for a purpose or purposes other than air cooling, the combination of:
   a. a heat exchanger;
   b. means for flowing air through said heat exchanger into the facility;
   c. means for diverting water from the water supply system at a diversion point upstream from a point of use of water in the facility to the heat exchanger, including a diverted water supply line;
   d. means for returning the diverted water to the water supply system downstream from said diversion point and upstream from said point of use as long as the rate of water use downstream from said diversion point is at least equal to the rate of water diversion at said point of diversion, including a diverted water return line;

e. whereby the diverted water returned to the water supply system is available for use at said point of use for a purpose or purposes other than air cooling;
f. pump means in one of said diverted water lines for circulating water through said diverted water supply line, said heat exchanger and said diverted water return line; and
g. means for mixing water in said diverted water return line with water in said diverted water supply line and for delivering the resulting diverted water mixture to said heat exchanger, whereby at least part of the water in sad diverted water return line is recirculated through said heat exchanger.

5. An air-cooling system as set forth in claim 4 wherein said mixing means includes mixing valve means communicating with said diverted water supply and return lines, and includes thermostat means responsive to the temperature of cooled air emanating from said heat exchanger for controlling said mixing valve means.

UNITED STATES PATENT OFFICE
CERTIFICATE OF CORRECTION

Patent No. 3,550,677          Dated December 29, 1970

Inventor(s) James A. Knowles

It is certified that error appears in the above-identified patent and that said Letters Patent are hereby corrected as shown below:

Column 1, line 6, "?arge" should be --large--;

Column 1, line 7, "?orally," should be --Normally,--;

Column 1, line 8, "?erving" should be --serving--;

Column 1, line 9, "?esired" should be --desired--;

Column 1, line 9-10, "tem?perature" should be --temperature--;

Column 1, line 11, "?ystem" should be --system--;

Column 1, line 12, "?arried" should be --carried--;

Column 1, line 13, "?f" should be --of--;

Column 1, line 14, "?or" should be --for--;

Column 1, line 15-16, "labora?ories" should be --laboratories--

Column 1, line 17-18, "laborato?ies" should be --laboratories--

Column 1, line 18-19, "tem?erature" should be --temperature--;

Column 1, line 20, "?xist" should be --exist--;

Column 1, line 21, "?eating" should be --heating--;

Column 1, line 21-22, "ob?ectionable" should be --objection-able--;

Column 1, line 26, "?f" should be --of--;

UNITED STATES PATENT OFFICE
CERTIFICATE OF CORRECTION

Patent No. 3,550,677  Dated December 29, 1970

PAGE - 2

Inventor(s) James A. Knowles

It is certified that error appears in the above-identified patent and that said Letters Patent are hereby corrected as shown below:

Column 1, line 27, "?ool" should be --cool--;

Column 1, line 28, "?mployed" should be --employed--;

Column 1, line 29, "?recooled" should be --precooled--;

Column 1, line 29-30, "condi?ioning" should be --conditioning--;

Column 1, line 31, "?he" should be --the--;

Column 1, line 33, "?bject" should be --object--;

Column 1, line 34, "?ooling" should be --cooling--;

Column 1, line 35, "?ystem" should be --system--;

Column 1, line 37, "?" should be --a--;

Column 3, line 14-15, "pneumatic-mixing" should be --pneumatic mixing--;

Column 3, line 19-20, "pneumatic-mixing" should be --pneumatic mixing--;

Column 3, line 24, "pneumatic-mixing" should be --pneumatic mixing--;

Column 5, line 10, "sad" should be --said--.

Signed and sealed this 23rd day of March 1971.

(SEAL)
Attest:

EDWARD M. FLETCHER, JR.
Attesting Officer

WILLIAM E. SCHUYLER, JR.
Commissioner of Patents